Dec. 16, 1930. M. D. NEILSON Re. 17,903
PROCESS OF MAKING GARMENTS FOR WOMEN AND CHILDREN
Original Filed June 22, 1920 2 Sheets-Sheet 1
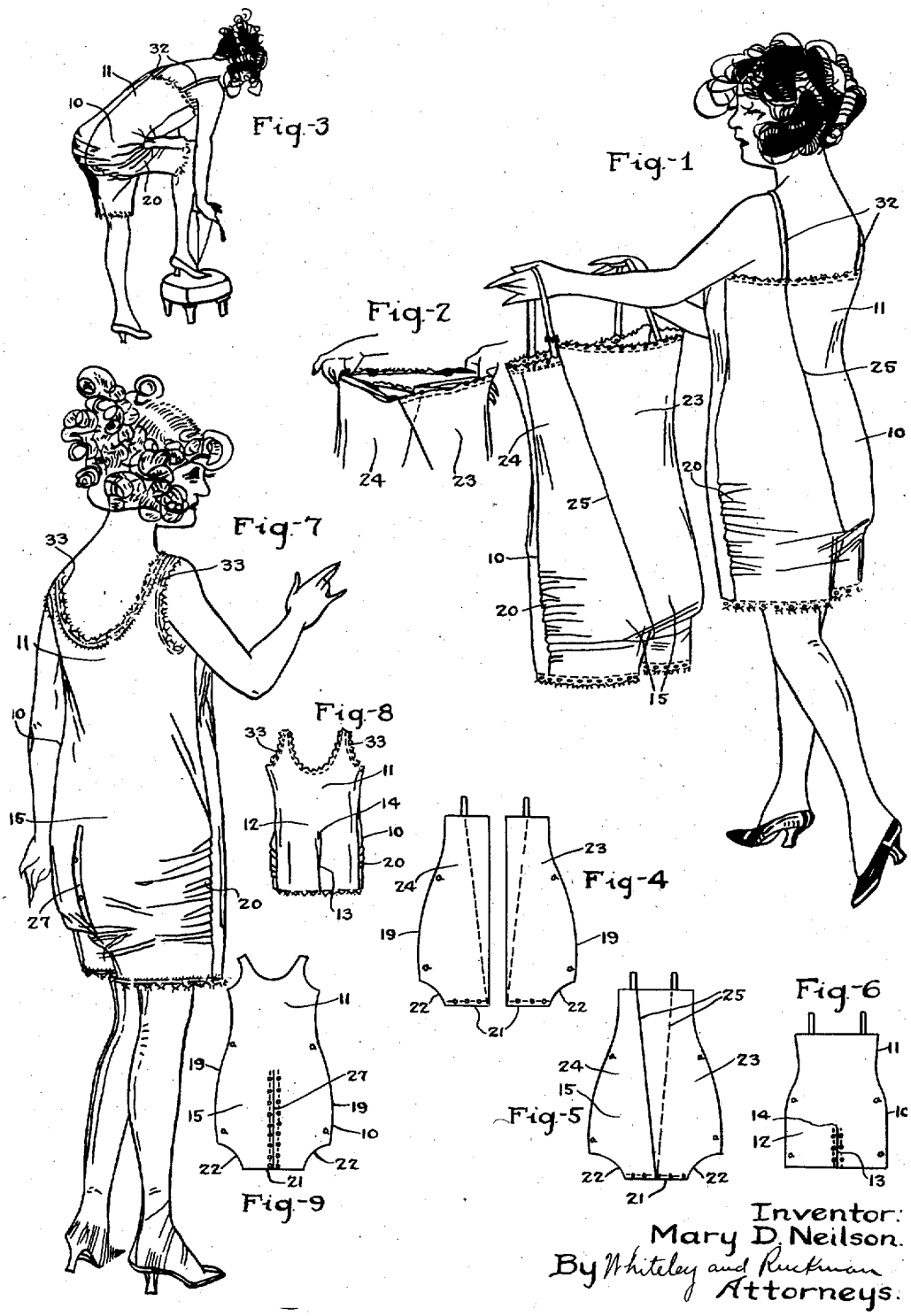
Inventor:
Mary D. Neilson.
By Whiteley and Ruckman
Attorneys.

Dec. 16, 1930. M. D. NEILSON Re. 17,903
PROCESS OF MAKING GARMENTS FOR WOMEN AND CHILDREN
Original Filed June 22, 1920 2 Sheets-Sheet 2
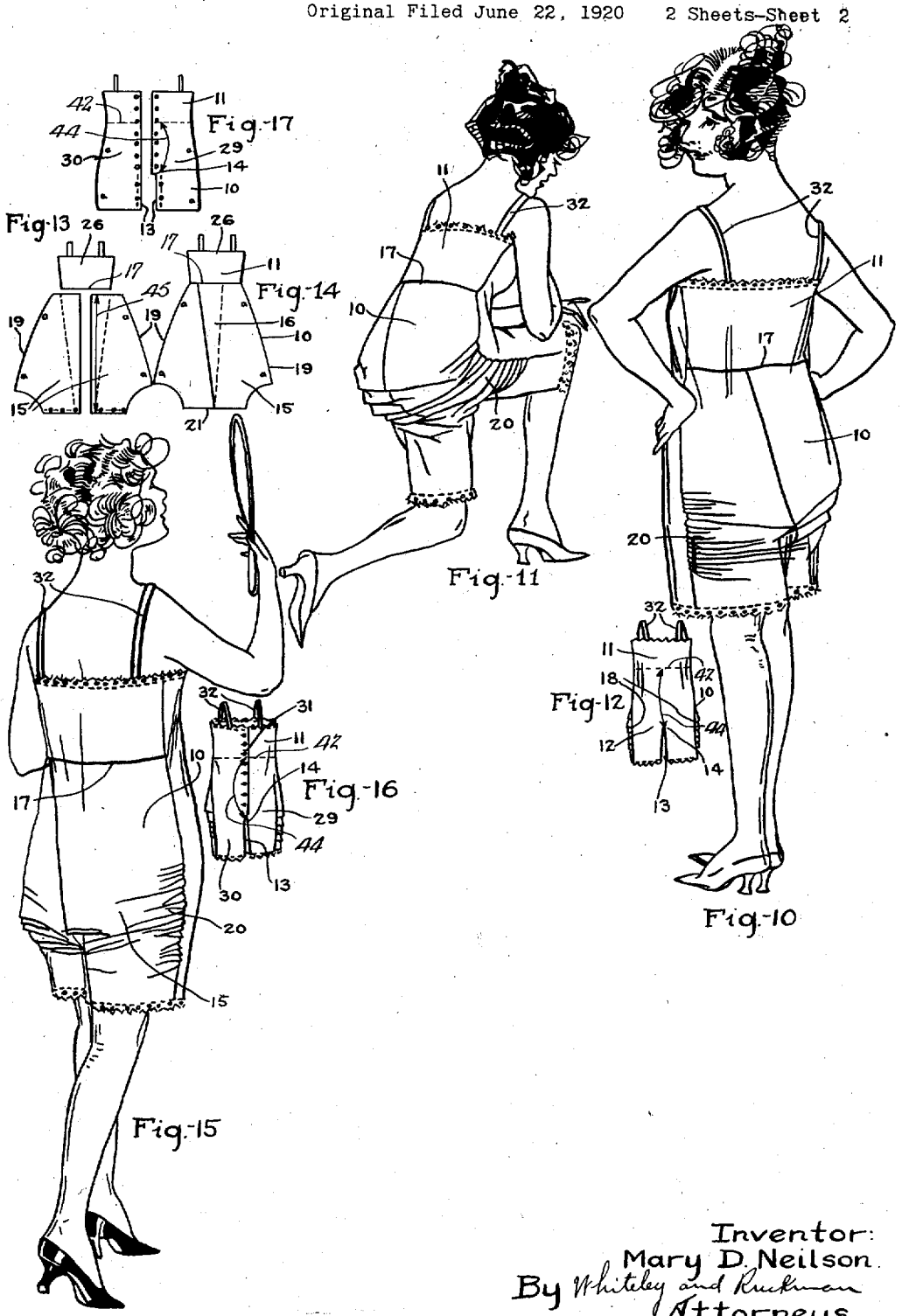
Inventor:
Mary D. Neilson
By Whiteley and Ruckman
Attorneys.

Reissued Dec. 16, 1930

Re. 17,903

UNITED STATES PATENT OFFICE

MARY D. NEILSON, OF MINNEAPOLIS, MINNESOTA

PROCESS OF MAKING GARMENTS FOR WOMEN AND CHILDREN

Original application filed June 22, 1920, Serial No. 390,731. Renewed December 5, 1927. Original No. 1,680,267, dated August 7, 1928. Application for reissue filed July 24, 1930. Serial No. 470,504.

My invention relates to a process of making garments for women and children such as bloomers and the like, and has for its object to provide such garments made of muslin or other goods wherein the trousers or bloomer portion shall adapt itself well to the form of the wearer no matter what the position of the body without any tension or strain at any point, and wherein the front of the garment is straight hanging when the position of the wearer is erect and the back of the garment has excess length of material running back from the point of the crotch at the center line of the front.

A further object of the invention is to provide such a garment with a single back opening, which in one form is self-closing and wherein the garment fits the body so perfectly that the body is completely covered in all positions.

A further object of the invention is to provide a garment of the type described which is suspended from the shoulders of the wearer, and wherein whether the opening be self-closing or buttons or fasteners are employed, there will be extra fullness above the bust or waist, and the garment will fit the body in all positions of the wearer, so that binding, strains and tension particularly at the hips and crotch, are completely avoided.

Specifically, the garment may embody a waist and drawers or trousers portion, but the chief features of novelty of the garment are found in the drawers or trousers portion and are equally effective whether there is or is not a waist portion. The garment in all of its modifications, embodies a front which may be formed of a single piece or of two pieces secured together along the center line of the front to a point thereon at the exact front of the crotch of the garment. From that point said front member has a center cleft or division which starts at the front of the crotch in the longitudinal center line of said front part. Said front member is adapted to have sewed to its side edges and to the cleft a back number (as specifically shown in one or two pieces) which has longer side edges than the edges of the front member, said extra length being taken up by gathering along one portion of the seam, and said back member further being formed with symmetrically positioned edge portions at the lower sides of the bottom thereof to form bottom edges of the legs of the garment, and having a bottom edge portion between said last named edge portions which is double the length of each edge of said cleft or division. An important feature of this construction is the relation between the length of the rear portion to the length of the front portion. This relation is substantially that the rear portion or back part has excess length of material at its central portion which along its center line is substantially double in length the distance from the starting point at the front of the crotch of the garment of the division or cleft in said front along the center line of the front part to the waistline of the garment.

The back portion may be made so as to provide a rear opening either overlapping to be self-closing or adapted to be closed with buttons or snaps. In this way, a garment is provided which hangs straight and fits the figure at the front and which has a requisite degree of fullness at the seat portion of the drawers or trousers, so that when the body is bent, there will be material to take up the extra length over the bent rear portion of the body not only along the center of the back but along these portions of the back which extend directly down from the shoulders and over the buttocks.

The full objects and advantages of my invention will appear in connection with the detailed description thereof, and the novel features of the invention are particularly pointed out in the claims.

In the drawings illustrating some applications of my invention—

Fig. 1 is a perspective view of the garment in position upon a wearer showing the straight hang of the front and also the fullness of the back part of the garment, and also showing the garment in perspective elevation independent of the wearer. Fig. 2 is a fragmentary detail view showing the manner in which a self-closing effect to the rear opening is obtained in one form of the garment. Fig. 3 illustrates the effect of the fullness in the rear portion of the trousers or drawers part of the garment in avoiding strains in contorted or bent positions of the body. Figs. 4, 5, and 6 are pattern details showing the manner of construction of the garment illustrated in Fig. 1. Fig. 7 illustrates a garment in position on the form of the wearer wherein the open back has been eliminated, the back being in one section with an opening for a short distance up the center. This figure also shows the straight hanging character of the front along its side. Fig. 8 illustrates the front of the garment shown in Fig. 7 with a front similar to that of Fig. 6 excepting that a finished waist yoke is employed instead of band straps. Fig. 9 is a pattern view of the back used in Fig. 7.

Figs. 10 and 11 show a form of garment on the wearer in different positions wherein the open back is intercepted by a fashioned waist. Fig. 12 shows the front of this garment, and if the waist portion were eliminated above the waistline shown in Figs. 10 and 11 and in Fig. 15 a simple bloomer garment would result. Figs. 13 and 14 are patterns of the garment shown in Figs. 10 and 11 employing the front of Fig. 6 or Fig. 12. Fig. 15 shows fitted to the form of the wearer a garment similar to that shown in Fig. 10 except that the same is open down the front. Fig. 16 shows the front view of the garment of Fig. 15. Fig. 17 is a pattern of the front of Fig. 15 which is attached to the portion shown in Figs. 13 and 14 to produce the garment of Fig. 15.

The garment is generally shown in the drawings as a combination garment comprising a drawers portion 10 and a waist portion 11. The waist portion is in effect the same in each of the garments and does not materially affect or modify the drawers portion of the garment or the features of novelty, which are found in the drawers portion but not in the waist portion, for which reason the front and back of the garment will be referred to herein without attempting to distinguish whether a waist portion be attached to the drawers portion or not. A front 12 is provided which is substantially the same in each form of garment shown. In each case, the front 12 is provided with a center cleft or division 13 running from a starting point 14 in the longitudinal center line of said front at the exact front of the crotch of the garment. A back 15 is provided which may be formed of two pieces as in Figs. 13 and 14 or in one piece as in Fig. 9. When formed in two pieces as above described, it is simply for the purpose of overlapping the pieces as indicated at 16 and sewing them to a waistband as indicated at 17, the resulting back, whether in one piece or in two therefore is effective in producing the structure of the draws portion of the garment, and is that portion extending downwardly from the waistline as shown in Fig. 14. The edges 18 of the front portion 12 are shorter than the edges 19 of the back portion 15 and when said back and front portions are united the excess material in the back portion along these edges is gathered as indicated at 20 which aids in giving the desired fullness to the seat of the drawers portion of the garment. This back portion 15 when so considered as an entity as shown in Figs. 5 and 14 comprises a lower bottom edge 21 with curved portions 22 extending symmetrically from the ends of said bottom edge 21 to the side edges 19, and the back comprises excess length along its center from the waist line to the center of the bottom line 21 which is substantially double the distance from the starting point 14 of the division 13 of the front of the garment to the waistline of the front of the garment.

In completing the garment, the edges of the division 13 are sewed to the corresponding halves of the bottom edge 21 of the back portion 15 which edge 21 is exactly twice the length of either edge of division 13. This produces a garment wherein the front hangs straight in both body and legs when the form of the wearer is erect and there is a large amount of fullness thrown to the back to give extra length when the body and limbs take extreme bent or contorted positions as shown in Figs. 3 and 11.

As shown in Figs. 4 and 5, the back part may comprise two members 23 and 24 which can overlap at the shoulder line as indicated at 25, thus giving a self-closing opening throughout the length of the body as shown in Figs. 1 and 5, or it may consist in three members as illustrated in Figs. 10 to 15 wherein there is added a waist portion 26 to which the members overlapping as indicated at 16 are secured, the garment being shown in position in Figs. 10 and 15. Or the back part may be formed with a simple division 27 as in Figs. 7 and 9 for a back opening if that is desired which may be closed with buttons or fasteners. In the form of the garment shown in Figs. 16 and 17, the front may be formed in two pieces 29 and 30 fastened at the division starting point of the crotch 14 and opening through buttons 31 from that point up.

Where it is desired to support the garment from the shoulders ordinary straps 32 may be employed or fitted shoulder pieces 33 may be used as shown in Figs. 7 and 8.

It will be apparent that the garment in all of its forms has exactly the same character of drawers portion providing a fulled seat portion, straight hanging front portion and a central opening where desired at a minimum expense. Such a garment is comfortable to wear, may readily be supported from the shoulders, fitting the form of the wearer in a straight hanging and neat effective manner in the front, and gives a large amount of seat fullness in exactly the right places to permit sufficient extra length on the lines extending from the shoulder over the buttocks to take care of the most extreme movements of the limbs and body, as indicated in Figs. 3 and 11.

As already pointed out and as clearly set forth in the original oath and the supplemental oath of the applicant filed herewith, an essential feature of invention resides in the relation between the length of the rear and front respectively of the drawers portion of the garment. This length is taken along the center of the back from the waistline to the bottom and along the center of the front from the waistline to the division point 14. In Fig. 13 the waist line of the garment at the back is clearly marked, as the upward and lower portions of the back are shown in separate pieces. Taking the length of the separate upper back piece as a guide, I have laid off the same distance on the front pieces shown in Figs. 12, 15 and 16 and indicated the waistline so found by dotted line 42. The distance on these fronts between the division point 14 and the waistline 42 is indicated by the double arrow line 44, and the distance along the center of the back portion as shown in Fig. 13 is indicated by the double arrow line 45. This distance 45 along the center of the back from the waistline to the bottom is substantially double the distance 44 along the center of the front from the waistline 42 to the starting point 14, which expresses the relation between the front and back of the drawers part of the garment with reasonable accuracy.

I claim:

1. The process of making undergarments which consists in providing a front part and forming therein a division starting at a point in the longitudinal center line of said front part adjacent the front of the crotch, providing a back part having excess length of material at its central portion which along its center line from the waistline to the bottom is substantially double in length the distance from said starting point along the center line of the front part to the waist line of the garment, forming said back part with a central bottom edge portion double the length of each edge of said division, uniting said back part along its side edges to the side edges of said front part, and attaching said central bottom edge to the edges of said division with the center of said bottom edge at said division starting point, whereby legs are formed with crotch fullness extending directly back from the center of the front of the garment.

2. The process of making undergarments which consists in providing a front part and forming a division starting at a point in the longitudinal center line of said front part adjacent the front of the crotch, providing a back part with upwardly converging side edges each longer than the corresponding portions of the side edges of the front part and having excess length of material at its central portion which along its center line from the waistline to the bottom is substantially double in length the distance from said starting point along the center line of the front part to the waistline of the garment, forming said back part with a central bottom edge portion double the length of each edge of said division, uniting said back part along its side edges to the side edges of said front part and gathering the back part in portions of said union to take up the greater length of the edges of said back part, and uniting said central bottom edge with the edges of said division with the center of said bottom edge at said division starting point, whereby legs are formed with crotch fullness extending directly back from the center of the front of the garment.

3. The process of making undergarments which consists in forming a division along the lower portion of the longitudinal center line of a front part, providing a back part divided at the bottom substantially along the longitudinal center line thereof for a portion of its length and having centrally positioned bottom edges of a combined length double the length of said front division and having curved edges extending between the bottom edge and the side edges and adapted to form continuations of the bottom edges of the front part when the garment is assembled, uniting said front and back parts along the side edges, and uniting the combined central bottom edge of the back part to the edges of the division of the front part to form the legs of the garment with a central rear opening extending rearwardly and upwardly from the upper point of said division at the crotch of the garment to a point in the back near the waistline of the garment.

4. The process of making undergarments which consists in providing a front part and forming a division starting at a point in the longitudinal center line of said front part, adjacent the front of the crotch, providing a back part having excess length of material at its central portion which along its center line from the waistline to the bottom is substantially double in length the distance from said starting point along the center line of the front part to the waistline of the garment, forming said back part with symmetrically positioned edge portions at the lower sides of the bottom thereof to form bottom edges of the legs of the garment with a bottom edge portion between said last named edge portions which is double the length of each edge of said division, uniting said back part along its side edges to the side edges of said front part, and attaching said central bottom edge to the edges of said division with the center of said bottom edge at said division starting point, whereby legs are formed with crotch fullness extending directly back from the center of the front of the garment.

In testimony whereof, I hereunto affix my signature.

MARY D. NEILSON.